US012725012B2

(12) United States Patent
Cherubini et al.

(10) Patent No.: US 12,725,012 B2
(45) Date of Patent: Sep. 1, 2026

(54) LOW-LATENCY TIME-ENCODED SPIKING NEURAL NETWORK

(71) Applicant: INTERNATIONAL BUSINESS MACHINES CORPORATION, Armonk, NY (US)

(72) Inventors: Giovanni Cherubini, Rueschlikon (CH); Marcel A. Kossel, Reichenburg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/299,392

(22) Filed: Apr. 12, 2023

(65) Prior Publication Data

US 2024/0346296 A1 Oct. 17, 2024

(51) Int. Cl.
*G06N 3/08* (2023.01)
*G06N 3/049* (2023.01)

(52) U.S. Cl.
CPC ............... *G06N 3/049* (2013.01); *G06N 3/08* (2013.01)

(58) Field of Classification Search
CPC .. G06N 3/00; G06N 5/00; G06N 7/00; G06N 10/00; G06N 20/00; G06N 99/00
See application file for complete search history.

(56) References Cited

U.S. PATENT DOCUMENTS

2022/0278755 A1 9/2022 Lee
2023/0376736 A1* 11/2023 Cherubini .............. G06N 3/049
2024/0403619 A1* 12/2024 Shaiba Nassar ..... G06N 3/0495

OTHER PUBLICATIONS

B. Fang, Y. Zhang, R. Yan and H. Tang, "Spike Trains Encoding Optimization for Spiking Neural Networks Implementation in FPGA," 2020 12th International Conference on Advanced Computational Intelligence (ICACI), Dali, China, 2020, pp. 412-418, doi: 10.1109/ICACI49185.2020.9177793. (Year: 2020).*

Wang R, Cohen G, Stiefel KM, Hamilton TJ, Tapson J and van Schaik A (2013) An FPGA Implementation of a Polychronous Spiking Neural Network with Delay Adaptation. Front. Neurosci. 7:14. doi: 10.3389/fnins.2013.00014 (Year: 2013).*

(Continued)

*Primary Examiner* — Kakali Chaki
*Assistant Examiner* — Johnathan R Germick
(74) *Attorney, Agent, or Firm* — Kimberly Zillig

(57) ABSTRACT

A method of executing a time-encoded spiking neural network (tSNN) that includes configuring an electronic circuit connecting pairs of neurons of the tSNN, wherein each pair of the pairs of neurons connects a sender neuron to a receiver neuron through parallel channels, and operating the electronic circuit at an actual clock rate corresponding to actual time steps, for the electronic circuit to perform signaling over said each pair at each time step of the actual time steps by sending signals in parallel across the parallel channels. Sent signals encode subcycle timing information about a timing of spikes relative to subcycle time steps, a unit duration that corresponds to a duration of said each time step divided by a latency reduction factor (LRF), for the operated electronic circuit to emulate an execution of the tSNN at an effective clock rate corresponding to the actual clock rate multiplied by the LRF.

20 Claims, 10 Drawing Sheets

(56) References Cited

OTHER PUBLICATIONS

Bouvier, M. et al. 2019. Spiking Neural Networks Hardware Implementations and Challenges: A Survey. J. Emerg. Technol. Comput. Syst. 15, 2, Article 22 (Apr. 2019), 35 pages. https://doi.org/10.1145/3304103.

Cherubini, G. et al., "Neuron Circuits for Spiking Neural Networks," U.S. Appl. No. 17/664,432, filed May 23, 2022.

Garg, I. et al, "DCT-SNN: Using DCT to Distribute Spatial Information over Time for Low-Latency Spiking Neural Networks," 2021 IEEE/CVF International Conference on Computer Vision (ICCV), Montreal, QC, Canada, 2021, pp. 4651-4660, doi: 10.1109/ICCV48922.2021.00463.

Gerlinghoff, Z. et al, "E3NE: An End-to-End Framework for Accelerating Spiking Neural Networks With Emerging Neural Encoding on FPGAs" in IEEE Transactions on Parallel & Distributed Systems, vol. 33, No. 11, pp. 3207-3219, 2022. doi: 10.1109/TPDS.2021.3128945.

Han, B. et al. 2020. Deep Spiking Neural Network: Energy Efficiency Through Time Based Coding. In Computer Vision—ECCV 2020: 16th European Conference, Glasgow, UK, Aug. 23-28, 2020, Proceedings, Part X. Springer-Verlag, Berlin, Heidelberg, 388-404. https://doi.org/10.1007/978-3-030-58607-2_23.

Liu, F. et al. (2021) SSTDP: Supervised Spike Timing Dependent Plasticity for Efficient Spiking Neural Network Training. Front. Neurosci. 15:756876. doi: 10.3389/fnins.2021.756876.

Park, S. et al. 2020. T2FSNN: deep spiking neural networks with time-to-first-spike coding. In Proceedings of the 57th ACM/EDAC/IEEE Design Automation Conference (DAC '20). IEEE Press, Article 25, 1-6.

Rathi, N. et al "DIET-SNN: A Low-Latency Spiking Neural Network With Direct Input Encoding and Leakage and Threshold Optimization," in IEEE Transactions on Neural Networks and Learning Systems, doi: 10.1109/TNNLS.2021.3111897.

Widmer, S. (2022) Master Thesis: "Design of Time-Encoded Spiking Neural Networks" OST—Eastern Switzerland University of Applied Sciences (in collaboration with IBM Rearch GmbH) 85 pgs.

* cited by examiner

LOW-LATENCY TIME-ENCODED SPIKING NEURAL NETWORK

TECHNICAL FIELD

The disclosure relates in general to the fields of methods and electronic circuits for executing time-encoded spiking neural networks (tSNNs). In particular, it is directed to methods and electronic circuits for emulating the execution of a tSNN at a clock rate that is a multiple of the actual clock rate of the tSNN, i.e., to reduce the latency in tSNNs and, in turn, improve the energy efficiency.

BACKGROUND

Machine learning often relies on artificial neural networks (ANNs), which are computational models inspired by neural networks in biological brains. Such systems progressively and autonomously learn tasks by means of examples. They have been successfully applied to a number of tasks, such as speech recognition, text processing, and computer vision.

An ANN includes a set of connected units (or nodes), which compare to biological neurons; they are accordingly called artificial neurons (or simply neurons). Signals are transmitted along connections (also called edges) between the artificial neurons, similarly to synapses, i.e., an artificial neuron that receives a signal processes it and then signals connected neurons. “Signaling” operations refer to signals conveyed along such connections. The signals typically encode real numbers. The outputs of the artificial neurons are usually computed thanks to a non-linear function of the sum of its inputs.

Connection weights (also called synaptic weights) are associated with the connections between nodes. Each neuron may have several inputs and a connection weight is attributed to each input (i.e., the weight associated with the corresponding connection). Such weights are learned during a training phase. The learning process can for instance be iteratively performed, in a supervised fashion. In other words, data examples are presented to the network in the form of input-output pairs, typically one at a time, and the weights associated with the input values are adjusted at each time step, for the network to learn to reproduce the outputs of the pairs based on the presented inputs. In ANNs performing classification tasks, the output typically consists of a label representing the class to be predicted by the network.

Various types of neural networks are known, starting with feedforward neural networks, such as multilayer perceptrons, deep neural networks, and convolutional neural networks. Besides, other types of neural networks were investigated, including spiking neural networks. A spiking neural network (SNN) substantially differs from conventional ANNs, inasmuch as SNNs operate using spikes, which are discrete binary events that can occur asynchronously at any point in time, rather than values that are systematically computed at each time step. That is, SNNs further incorporate the concept of time, in addition to neuronal and synaptic states. In SNNs, neurons fire only when a certain condition is met (e.g., the neuron membrane potential exceeds a predefined threshold value), rather than firing at each propagation cycle as in, e.g., multi-layer perceptron networks. “Firing” means, in the context of SNNs, that a neuron generates and transmits a signal to further connected neurons, which, in turn, increase or decrease the membrane potentials of the receivers. To summarize, SNNs can be regarded as biologically inspired neural networks, which encode information as spikes and rely on a form of neural dynamics based on integrate-and-fire dynamics.

Neural networks are typically implemented in software. However, a neural network may also be implemented in hardware, e.g., as an optical neuromorphic system, a system relying on resistive processing units (relying, e.g., on memristive crossbar array structures), or other types of neuromorphic circuits. Hardware-implemented neural networks are physical machines that differ from conventional computers in that they are primarily and specifically designed to execute neural network operations. Often, such hardware is meant for inferencing purposes, while the training of the underlying computational models is performed using conventional hardware or software.

SNNs are often claimed to be energy-efficient because neural information is exchanged either as rate-encoded or time-encoded spikes (or pulses), whose evaluation on the receive side results in fewer computational steps than the equivalent multiply-and-accumulate (MAC) operations in ANNs. In other words, no MAC operations (with wide bit widths) is needed in SNNs, contrary to ANNs. In principle, the sparsity of the required computational steps leads to a smaller power consumption compared to ANNs.

However, where SNNs rely on time-encoded spikes, the timing of the transmitted spikes needs to be resolved with a fine granularity, because the granularity in the time domain determines the resolution of the data signal encoded as spike instants. Now, a fine (i.e., small) time granularity increases the latency of SNNs, for a given maximum rate of operation of the underlying hardware, typically a maximum clock rate. In that case, the energy efficiency can become worse than that of ANNs, which only require a few clock cycles to compute the result of a MAC operation. Therefore, the present inventors took up the challenge to achieve more efficient implementations of time-encoded SNNs.

SUMMARY

According to a first aspect, the present disclosure is embodied as a method of executing a time-encoded spiking neural network (tSNN). The method first comprises configuring an electronic circuit connecting pairs of neurons of the tSNN, where each pair of the pairs of neurons connects a sender neuron to a receiver neuron through parallel channels. Next, the method operates the electronic circuit at an actual clock rate, which corresponds to actual time steps, for the electronic circuit to perform signaling over each pair of neurons (at each time step of the actual time steps) by sending signals in parallel across the parallel channels. Remarkably, the sent signals encode subcycle timing information about a timing of spikes relative to subcycle time steps. The unit duration of a subcycle time step corresponds to a duration of an actual time step divided by a latency reduction factor. Now, the actual clock rate of the electronic circuit makes it agnostic to timings of events occurring within subcycle time steps. Nevertheless, since the subcycle timing information is encoded in the signals sent through the sets of parallel channels, the electronic circuit can be operated to recover such information and emulate an execution of the tSNN at a higher effective clock rate, where the effective clock rate corresponds to the actual clock rate multiplied by the latency reduction factor.

The proposed method allows a latency reduction to be achieved in tSNNs. Even though the electronic circuit is agnostic to the subcycle timing information that would normally be processed by a circuit operated at the effective clock rate, this timing information is nevertheless recovered thanks to information contained in the parallel signals. Now, as such signals are sent at a lower frequency (corresponding to the actual clock rate), less energy is required to operate the circuit, as long as the additional energy required for the parallel data transmission of the subcycle timing information remains smaller than the energy required for operating the electronic circuit with a latency reduction factor equal to 1, i.e., at the maximum time resolution.

In embodiments, the electronic circuit is operated in accordance with a time-to-spike encoding, whereby the reconstructed timing of the spikes refers to time periods extending to an end of said each time step. In other embodiments, the electronic circuit operated in accordance with a time-to-first-spike encoding, whereby the reconstructed timing of the spikes refers to time durations elapsed since a beginning of said each time step.

In embodiments, operating the electronic circuit further comprises, at the receiver neuron, processing the signals (at each time step) as received at the receiver neuron to reconstruct the timing of the spikes and accordingly update a membrane potential. The membrane potential is preferably updated in accordance with each of a first value and a second value. The first value encompasses the reconstructed timing of the spikes and is obtained as a multiplication of a synaptic weight (associated with each pair) by a sum of fractional timing values as encoded in respective ones of the signals sent. The term "fractional timing" refers to timing information occurring within the subcycle time steps. The second value corresponds to a constant value, which is obtained as a multiplication of the latency reduction factor by said synaptic weight. In preferred embodiments, the electronic circuit includes one or more hardware-implemented lookup tables (LUTs). In that case, the first value can be efficiently obtained through one of the LUTs.

Preferably, the parallel channels connecting each pair of neurons are associated with respective, predetermined channel weights. In that case, the sum of the fractional timing values is computed as a weighted sum, wherein the fractional timing values are weighted in accordance with the respective, predetermined channel weights. The fractional timing values can for instance be represented using a binary number representation. For example, the latency reduction factor L can be set equal to $2^l$, where l is equal to the number of the parallel channels. In that case, the respective predetermined weights of the parallel channels follow a geometric progression, where the weights increase in powers of 2, i.e., like 1, 2, 4, 8, etc. That is, the first term of the progression is equal to one (i.e., the numerical value 1), while its common ratio is equal to two (i.e., the numerical value 2). In other words, each channel is binary encoded and is assigned a specific weight, which makes it possible to minimize the number of channels required for a given latency reduction factor L. A satisfactory trade-off is achieved for L=16, whereby the number l of parallel channels is equal to 4 for each pair.

In preferred embodiments, operating the electronic circuit further comprises, at the receiver neuron: (i) determining characteristics of further signals in accordance with the updated membrane potential, the further signals meant to encode subcycle timing information about further spikes, and (ii) generating and sending the further signals through the parallel channels connecting the receiver neuron to a further neuron of the tSNN, in accordance with the determined characteristics.

According to another aspect, the disclosure is embodied as an electronic circuit for executing a tSNN, where the electronic circuit comprises hardware-implemented neurons, onto which neurons of the tSNN can be mapped. The electronic circuit connects pairs of neurons of the tSNN, where each of the pairs of neurons connects a sender neuron to a receiver neuron through parallel channels. Moreover, the electronic circuit is configured to operate at an actual clock rate corresponding to actual time steps, for the electronic circuit to perform signaling over each pair at each time step of the actual time steps by sending signals in parallel across the parallel channels. In operation, the sent signals encode subcycle timing information about a timing of spikes relative to subcycle time steps, a unit duration of which corresponds to a duration of each time step divided by a latency reduction factor, for the operated electronic circuit to emulate an execution of the tSNN at an effective clock rate corresponding to the actual clock rate multiplied by the latency reduction factor.

In preferred embodiments, the latency reduction factor L is equal to $2^l$, where l is equal to the number of parallel channels connecting the sender neuron to the receiver neuron in said each pair. Again, the parallel channels are associated with respective, predetermined channel weights, which increase in powers of 2, as explained above.

Preferably, any neuron of the hardware-implemented neurons includes: (i) one or more synaptic receiver units designed to receive and process signals transmitted through the parallel channels to said any neuron, (ii) a ripple carry adder unit designed to update a membrane potential of said any neuron, in accordance with signals processed at the one or more synaptic receiver units, and (iii) a synaptic transmitter unit designed to generate and transmit signals in accordance with the updated membrane potential.

In embodiments, the electronic circuit is further configured so as for the receiver neuron to process, at said each time step, the signals as received at the receiver neuron to reconstruct a timing of the spikes and accordingly update a membrane potential. Preferably, the electronic circuit is further configured to: generate, at a subsequent time step of the actual time steps, further signals in accordance with the updated membrane potential, the further signals encoding subcycle timing information about further spikes; and send the further signals generated through the parallel channels connecting the receiver neuron to a further neuron of the tSNN.

In embodiments, the electronic circuit is configured to operate in accordance with a time-to-spike encoding. In other embodiments, the electronic circuit is configured to operate in accordance with a time-to-first-spike encoding. The electronic circuit preferably includes one or more hardware-implemented LUTs. In that case, the electronic circuit may obtain the subcycle timing information (to be encoded in the further signals) by looking up timing data in one of the one or more LUTs based on input values determined in accordance with a triangle similarity.

In embodiments, the electronic circuit is further configured so as for the receiver neuron to update the membrane potential in accordance with each of a first value and a second value. In operation, the first value encompasses the reconstructed timing of the spikes and is obtained as a multiplication of a synaptic weight associated with each pair of neuron by a sum of fractional timing values as encoded in respective ones of the signals sent. The second value corresponds to a constant value, which is obtained as a multiplication of the latency reduction factor by said synaptic weight. The electronic circuit may further be configured to obtain the first value through one of the LUTs.

BRIEF DESCRIPTION OF THE DRAWINGS

These and other objects, features and advantages of the present disclosure will become apparent from the following detailed description of illustrative embodiments thereof, which is to be read in connection with the accompanying drawings. The illustrations are for clarity in facilitating one skilled in the art in understanding the disclosure in conjunction with the detailed description. In the drawings:

FIGS. 6A-7D depict waveforms as processed and generated at neuronal circuits such as depicted in FIGS. 2 and 3. FIGS. 6A-6C relate to a TTS encoding, while FIGS. 7A-7C relate to a TTFS encoding.

In more detail, FIGS. 6A and 7A show integration signals as would likely be obtained by a tSNN operated at a clock rate corresponding to the time intervals shown in FIGS. 6A, 6B, 7A, and 7B, based on incoming spikes as shown in FIGS. 6B and 7B.

On the contrary, FIGS. 6C and 7C show integration signals obtained by a tSNN operated at an actual clock rate corresponding to the time intervals shown in FIGS. 6C, 6D, 7C, and 7D, based on incoming spikes as shown in FIGS. 6D and 7D. The parallel processing makes it possible to emulate an effective clock rate as in FIGS. 6A, 6B, 7A, and 7B, despite the fact that the actual clock rate is 16 times lower than the effective clock rate, as in embodiments.

Figure 2:
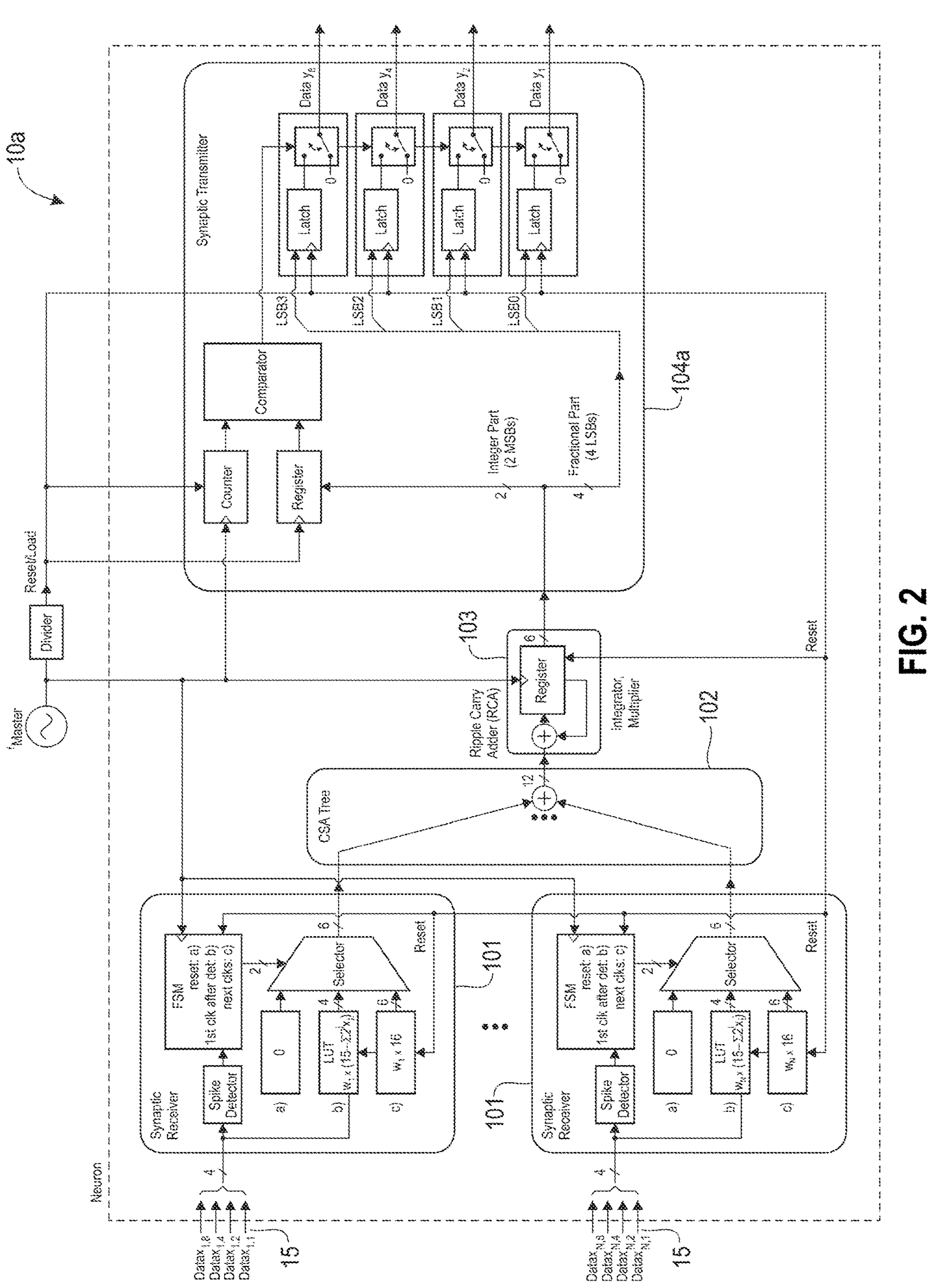
FIGS. 2 and 3 are simplified circuit diagrams of neuronal circuits for implementing a tSNN, as in embodiments. Each neuronal circuit corresponds to a respective inner neuron and explicitly shows two synaptic receivers only, for simplicity. The circuits of FIGS. 2 and 3 are respectively meant to be operated in accordance with a time-to-spike (TTS) encoding and a time-to-first-spike (TTFS) encoding.
Figure 3:
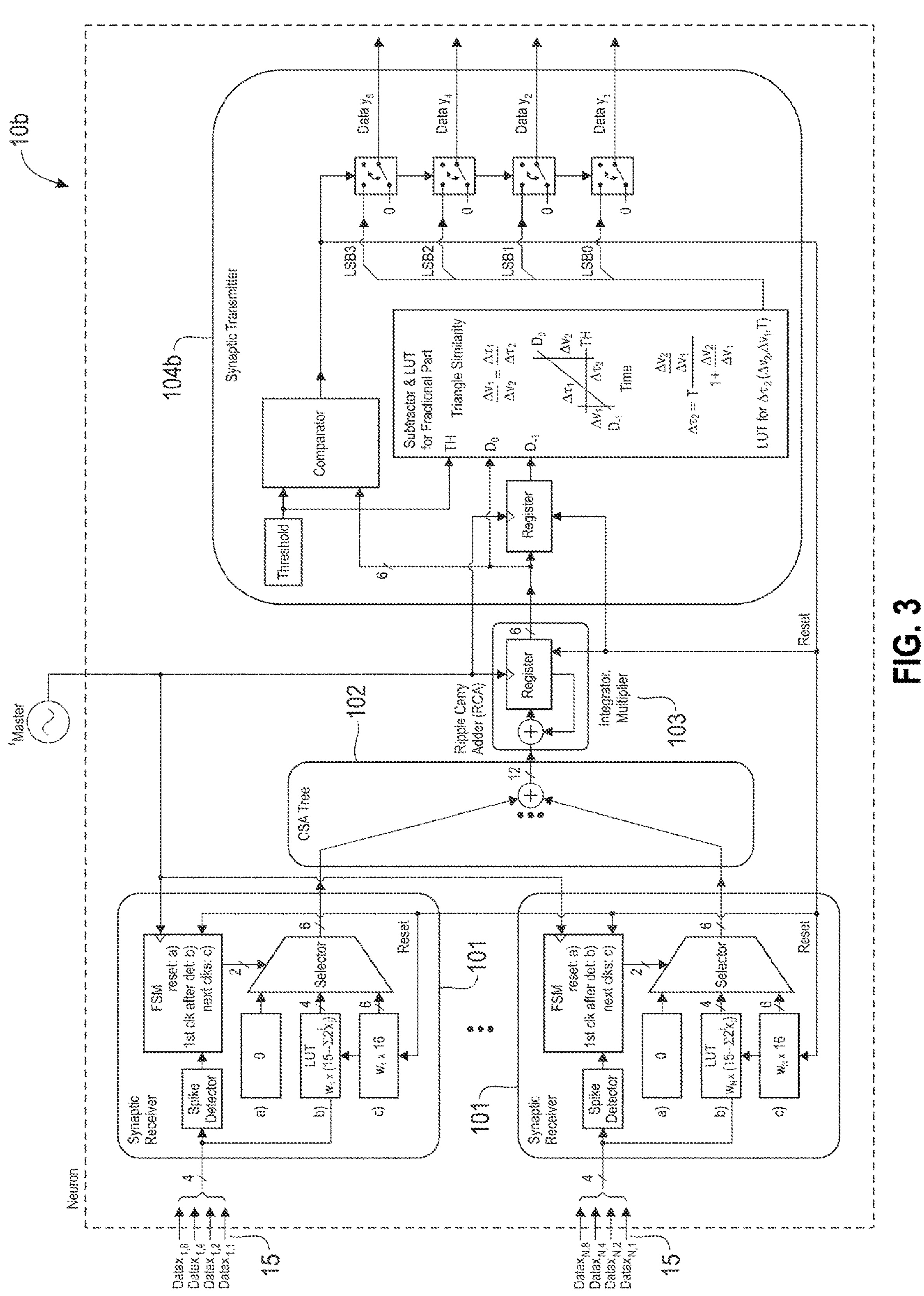

The accompanying drawings show simplified representations of devices or parts thereof, as involved in embodiments. Technical features depicted in FIGS. 2 and 3 are not necessarily to scale. Similar or functionally similar elements in the figures have been allocated the same numeral references, unless otherwise indicated.

Devices and methods embodying the present disclosure will now be described, by way of non-limiting examples.

DETAILED DESCRIPTION OF EMBODIMENTS OF THE DISCLOSURE

Figure 1:
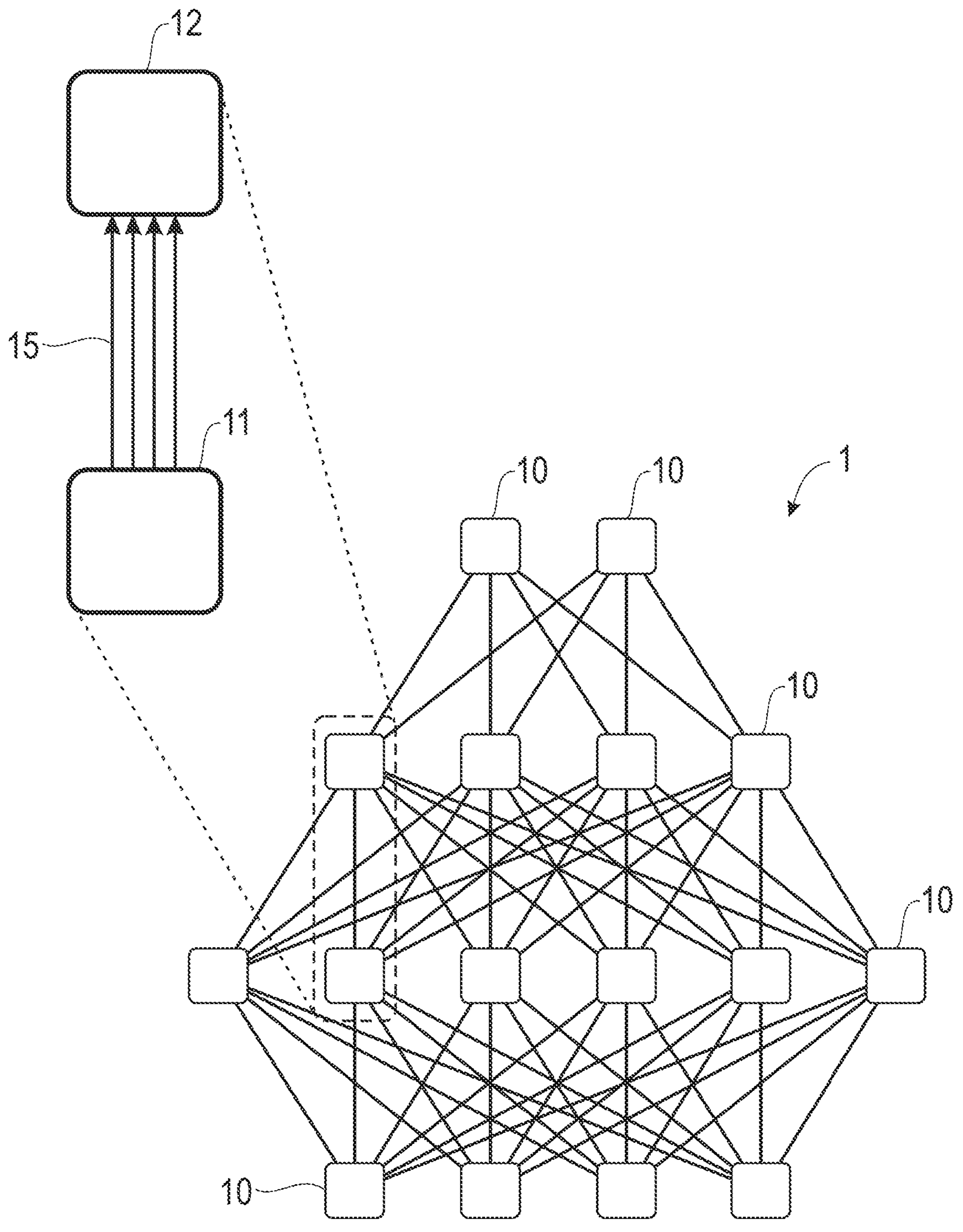
FIG. 1 is a diagram illustrating a possible architecture of a time-encoded spiking neural network (tSNN). The tSNN is implemented in dedicated hardware, where each pair of connected neurons is connected through a set of parallel channels, according to embodiments.
Figure 4:
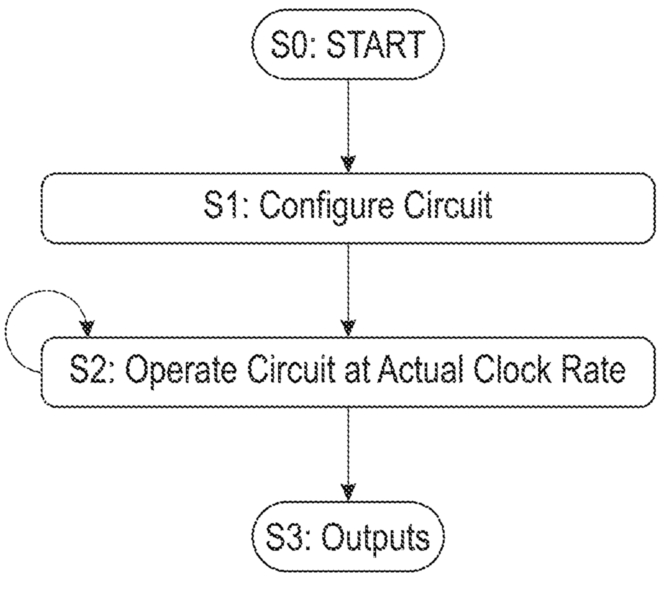
FIGS. 4 and 5 are flowcharts illustrating high-level steps of a method of executing a tSNN according to embodiments. Step S2 of FIG. 4 is subdivided into the sub-steps shown in FIG. 5.
Figure 5:
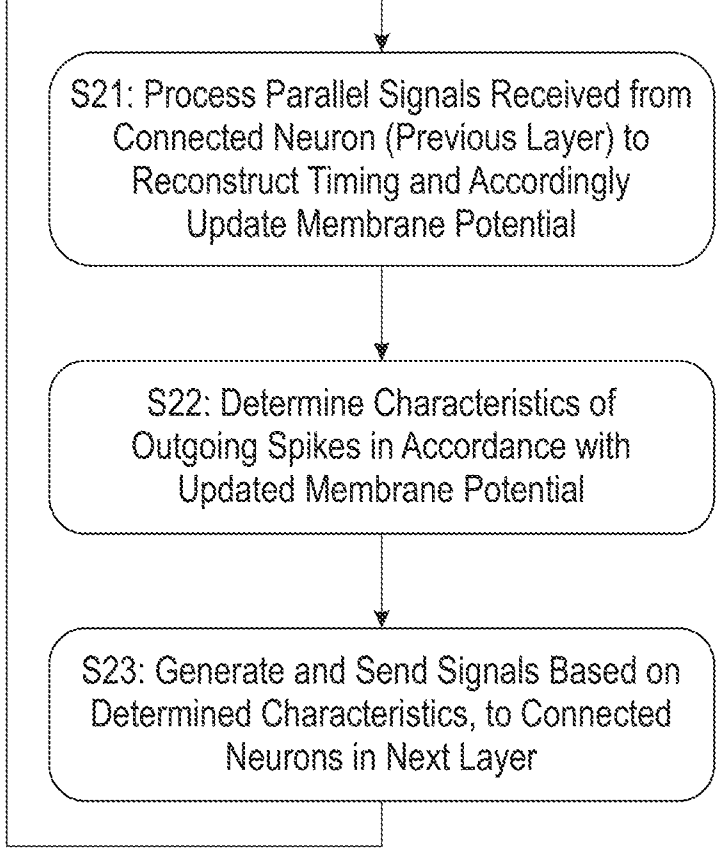

A first aspect of the disclosure is now described in reference to FIGS. 1, 4, and 5. This aspect concerns a method of executing a time-encoded spiking neural network (tSNN) 1. Note, this method and its variants are collectively referred to as the "present methods." All references Sn refer to methods steps of the flowcharts of FIGS. 4 and 5, while numeral references pertain to devices, components, and concepts involved in embodiments of the present disclosure.

The proposed method basically revolves around configuring an electronic circuit (step S1 in FIG. 4) and operating this electronic circuit (step S2). The architecture of the electronic circuit somehow reflects that of the underlying SNN 1, such as the SNN shown in FIG. 1. For this reason, the numeral reference 1 denotes both the SNN architecture and the corresponding electronic circuit. Each neuron is implemented by a dedicated circuit 10*a*, 10*b*, such as shown in FIGS. 2 and 3, i.e., the tSNN 1 is implemented by special-purpose hardware, as discussed later in reference to another aspect of the disclosure.

The electronic circuit is first configured S1 to adequately connect pairs of neurons 10 of the tSNN 1, whereby any neuron in any layer (but the input layer) is connected by at least one neuron of the previous layer. Each pair of connected neurons can be described as connecting a sender neuron 11 to a receiver neuron 12, as illustrated in the inset of FIG. 1. Importantly, the neurons of each connected pair are connected through a set of parallel channels 15, as seen in the inset of FIG. 1. The circuit may be designed to fully connect the neurons, layer-to-layer, whereby any neuron in any layer (but the input layer) is connected by any neuron in the previous layer, as in the fully connected example shown in FIG. 1. A fully connected network allows flexibility. If necessary, some of the connected pairs can be disabled upon configuring the circuit 1, should the underlying computational model not require such connections.

Once suitably configured, the electronic circuit is operated S2 at its actual clock rate to perform signaling over each pair of connected neurons and, this, at each actual time step corresponding to the actual clock rate. Yet, the circuit 1 is here operated with a view to emulating an operation at a higher, effective clock rate. That is, the actual clock rate corresponds to (and defines) actual time steps as shown in FIGS. 6C, 6D, 7C, and 7D, whereas the effective clock rate meant to be emulated corresponds to the shorter time steps shown in FIGS. 6A, 6B and 7A, 7B. The clock rate (also known as clock speed) refers to the operation frequency of the hardware-implemented neurons 10*a*, 10*b* and, in particular, the frequency at which incoming spikes are processed for integration.

In the present context, the electronic circuit is agnostic to the timing of information received during the actual time steps, because the circuit works at the actual clock rate of FIGS. 6C, 6D, 7C, and 7D. In order to be able to read such a timing, the circuit would have to operate at a higher clock rate, corresponding to shorter time steps. For this reason, such shorter time steps that are referred to as "subcycle time steps" and the corresponding timing information is referred to as "subcycle timing information." The unit duration of a subcycle time step corresponds to the duration of an actual time step divided by a given factor, here called "latency reduction factor," which is equal to 16 in the examples of FIGS. 6A-7D. Correspondingly, the effective clock rate is equal to the actual clock rate multiplied by the latency reduction factor. The effective and actual clock rates can be regarded as corresponding to an undecimated timing and a decimated timing, respectively.

Now, that an electronic circuit is agnostic to the timing of subcycle events also means that it cannot read the information that it would otherwise be able to access should it be operated at the effective clock rate. Remarkably, the signaling can nevertheless be performed so as to compensate for this impairment. Namely, here, the signaling is performed over each pair of connected neurons by sending S23 signals in parallel across the parallel channels 15, where the parallelized information allows the subcycle timing information to be recovered. In detail, the signals sent are signals that encode subcycle timing information about the timing of spikes relative to the subcycle time steps. As a result, the electronic circuit can be operated to retrieve such information and accordingly emulate an execution of the tSNN 1 at the effective clock rate, i.e., the actual clock rate multiplied by the latency reduction factor.

In other words, the proposed method allows a latency reduction to be achieved in tSNNs, where the extent of the reduction is determined by the latency reduction factor. As a result, it is no longer necessary to operate the circuit at a high time resolution to determine the timing of the spikes as per this time resolution, which makes the circuit more energy efficient. In turn, a tSNN can be executed with an energy efficiency comparable to, or better than a typical ANN, as exemplified later in the description.

Moreover, the proposed approach is compatible with both a time-to-spike (TTS) encoding and a time-to-first-spike (TTFS) encoding. Note, the TTS encoding assumes a synchronous time-to-first-spike mechanism and is, accordingly, sometimes abbreviated as sTTFS. When the electronic circuit is operated in accordance with a TTS encoding, the reconstructed timing of the spikes refers to time periods extending to an end of each time step. When operated in accordance with a TTFS encoding, the reconstructed timing of the spikes refers to time durations elapsed since a beginning of each time step, as discussed later in detail, in reference to particular embodiments.

The following describes preferred embodiments of the above latency reduction method. Note, the signaling operations discussed herein often refer to one particular pair of connected neurons, for the sake of conciseness. However, it should be borne in mind that similar signaling operations are potentially performed for all connected pairs of neurons, at each actual time step. A similar remark applies to steps performed in response to signaling operations. At each actual time step, each synaptic receiver integrates its own membrane potential based on all inputs received from the connected neurons of the previous layer, with a view to potentially sending signals to all connected neurons of the next layer.

Membrane potential. The electronic circuit is preferably operated so that the receiver neuron 12 processes, at each time step, any signals it receives to reconstruct the timing of incoming spikes and accordingly update its membrane potential, see step S21 in FIG. 5. The membrane potential is integrated by successively updating it at each (actual) time step, as and if necessary. Note, the membrane potential only starts updating after reception of the first spikes during a given actual time step. The update operation may well be completed during the same time step (i.e., the same cycle), as it can be almost instantaneously performed, notably in embodiments involving hardware-implemented lookup tables (LUTs), as discussed later. That being said, any delay in the data processing may cause a neuron to complete the membrane potential update operation during a subsequent time step, which, in turn, may postpone the moment at which the neuron fires.

Firing process. When operating the electronic circuit, each receiver neuron 12 determines S22 characteristics of further signals (corresponding to outgoing information) in accordance with its updated membrane potential. The further signals are meant to encode subcycle timing information about outgoing spikes. Each receiver neuron 12 can accordingly generate and send (step S23) outgoing signals through the sets of parallel channels 15 that connect this receiver neuron 12 to further neurons of the tSNN 1, in accordance with the determined signal characteristics. The timing of steps S22 and S23 depends on the chosen encoding scheme (TTS or TTFS), as further discussed later.

The signal characteristics determined at step S22 may actually include both the timing at which to fire and the values to be encoded in the outgoing signals, it being noted that such values may themselves encode timing information. Namely, in a TTS scheme, the signal characteristics are determined based on the value of the updated membrane potential as measured at the end of an observation interval, which consists of a multiple of an actual time step, while the determined signal characteristics relate to the time at which the updated membrane potential crosses a predetermined threshold in a TTFS scheme.

In embodiments, the membrane potential is updated S21 in accordance with two values, i.e., a first value and a second value. The first value encompasses the reconstructed timing of the spikes. This value is obtained as a multiplication of a synaptic weight $w_i$ (i.e., the weight associated with the synaptic connection between a sender neuron i and the receiver 12) by a sum of fractional timing values. The fractional timing values are the values encoded in the signals received by the receiver through respective channels of the parallel channels that connect neuron i to the receiver neuron 12.

The fractional timing values are denoted by $\Delta t_i (i=1, 2)$ in FIGS. 6C, 6D, 7C, and 7D. In these examples, i is equal to 1 or 2 because only two neurons (neurons 1 and 2) are assumed to fire toward the receiver 12 during the depicted intervals, for simplicity. Moreover, the signals received from neurons 1 and 2 are assumed to be received at consecutive actual time steps, to simplify the depictions. In practice, however, any receiver 12 may receive incoming signals from any connected neurons during any actual time step.

The second value corresponds to a constant value, which is obtained as a multiplication of the latency reduction factor (an integer, noted L) by the synaptic weight $w_i$, where L=16 in the examples of FIGS. 6C-7D. At the time instant the receiver neuron 12 receives fractional signals $\Delta t_i$, it integrates the corresponding values $\Delta t_i \times w_i$ and keeps adding the integer part $16 \times w_i$ at each following actual cycle. It does so until the end of the observation interval in a TTS encoding scheme or until a threshold is reached in a TTFS encoding scheme, i.e., while the first values $\Delta t_i \times w_i$ depends on whether fractional signals are received or not from neuron i during an actual time step, the constant part $16 \times w_i$ is continually incremented at each actual time step, following the time instant at which a fractional signal is received.

As evoked above, the electronic circuit may include one or more hardware-implemented LUTs, thanks to which substantial acceleration is achieved upon processing the signals. In the examples of FIGS. 2 and 3, each synaptic receiver unit 101 contains or interacts with a hardware-implemented LUT. Note, a LUT is preferably shared by several neurons, in the interest of parsimony, in case the synaptic weights over neuronal connections to a receiving neuron are the same. The LUT can notably be used to efficiently compute the first values $\Delta t_i \times w_i$. The LUTs can for instance be implemented by a circuit hardcoding the desired parameter values or as addressable memory elements. The LUT circuit(s) and other circuit components 101-104*b* are advantageously co-integrated in a same circuit.

The following concerns preferred implementations of the parallel channels and corresponding methods of processing the fractional data. The parallel channels 15 that connect each pair of neurons can advantageously be associated with distinct channel weights, i.e., the parallel channels are associated with respective, predetermined channel weights. The latter are intermediate weights, which should be distinguished from the synaptic weights. Interestingly, the channel weights can be chosen so that the sum of the fractional timing values can always be computed as a weighted sum, whereby the fractional timing values are weighted in accordance with the respective channel weights. The outcome of this sum is itself multiplied by the relevant synaptic weight, see item b) in FIG. 2 or 3. Instead of explicitly performing such operations, the outcome is most efficiently obtained through a LUT, which is included in or accessed by each synaptic receiver unit 101.

In particularly preferred embodiments, the fractional timing values are represented using a binary number representation. Meanwhile, the latency reduction factor L is equal to $2^l$, where l is equal to the number of the parallel channels (for each pair of connected neurons). Conversely, the number of parallel channels connecting each pair of connected neurons 15 is equal to $Log_2(L)$. In that case, the predetermined weights of the parallel channels can be chosen so as to increase in powers of 2, i.e., they follow a geometric progression, in which the first term is equal to 1, while the common ratio is equal to 2, i.e., the predetermined weights are equal to 1, 2, 4, and 8 if L=16. Any integer positive or zero value that is strictly less than 16 can be written as a combination of the values 1, 2, 4, and 8. As a whole, the term obtained through the LUT writes as $$w_i \times \left(15 - \sum_{j=0}^{3} 2^j x_j\right),$$

where the index i refers to the sender neuron i, and $x_j$ is the jth fractional value received through the jth channel. Note, the channel index j runs from 0 to 3 in the above equation, the data received by each synaptic receiver 101 is noted $Data_{i,k}$ in FIGS. 2 and 3, where the index k takes the successive values 1, 2, 4, 8, corresponding to $2^j$. The above approach makes it possible to minimize the number of channels required for a given latency reduction factor.

Setting the latency reduction factor to 16 implies that the number of parallel channels 15 is equal to 4 for each pair, which results in a satisfactory trade-off, i.e., on the one hand, a substantial latency reduction is achieved, while only 4 parallel channels are required between each connected neuron.

The above solution allows a 16×latency reduction to be obtained in a time encoded SNN. This is achieved applying a sub-rate scheme for the spike timing, whereby a tSNN with 6-bit resolution requires only 4 (instead of 64) time intervals for integration of the membrane potential. The values encoded within a decimated spiking time interval are weighted and transmitted in parallel between neurons, where the receiving neurons operate the respective integrator at sub-rate. The weighted spikes carry fractional data, while the integer part data is an integer multiple of the latency reduction factor. For example, for a 16× reduction, a data of 140 can be decomposed into an integer part, which is equal to 128 (i.e., 8×16), and a fractional part, which is equal to 140−128=12, which can be encoded as spikes over the weighted channels.

Other design choices are possible, though, e.g., one may choose L=8, requiring only three parallel channels per connection. And beyond binary representations, one may, more generally, rely on any suitable number representation system. Eventually, the number representation impacts the minimal number of parallel channels.

Figures 6A, 6B:
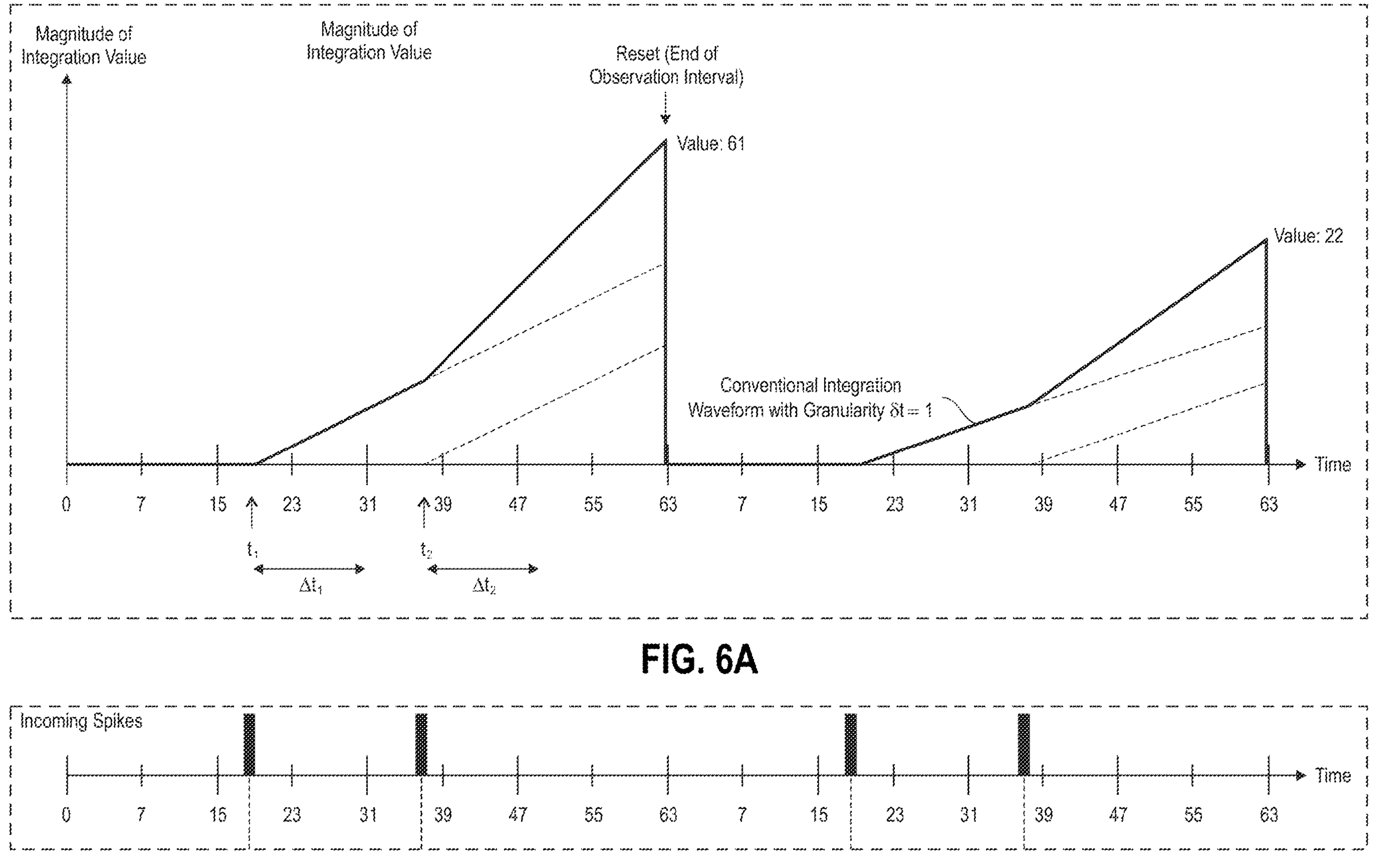
Figure 6C:
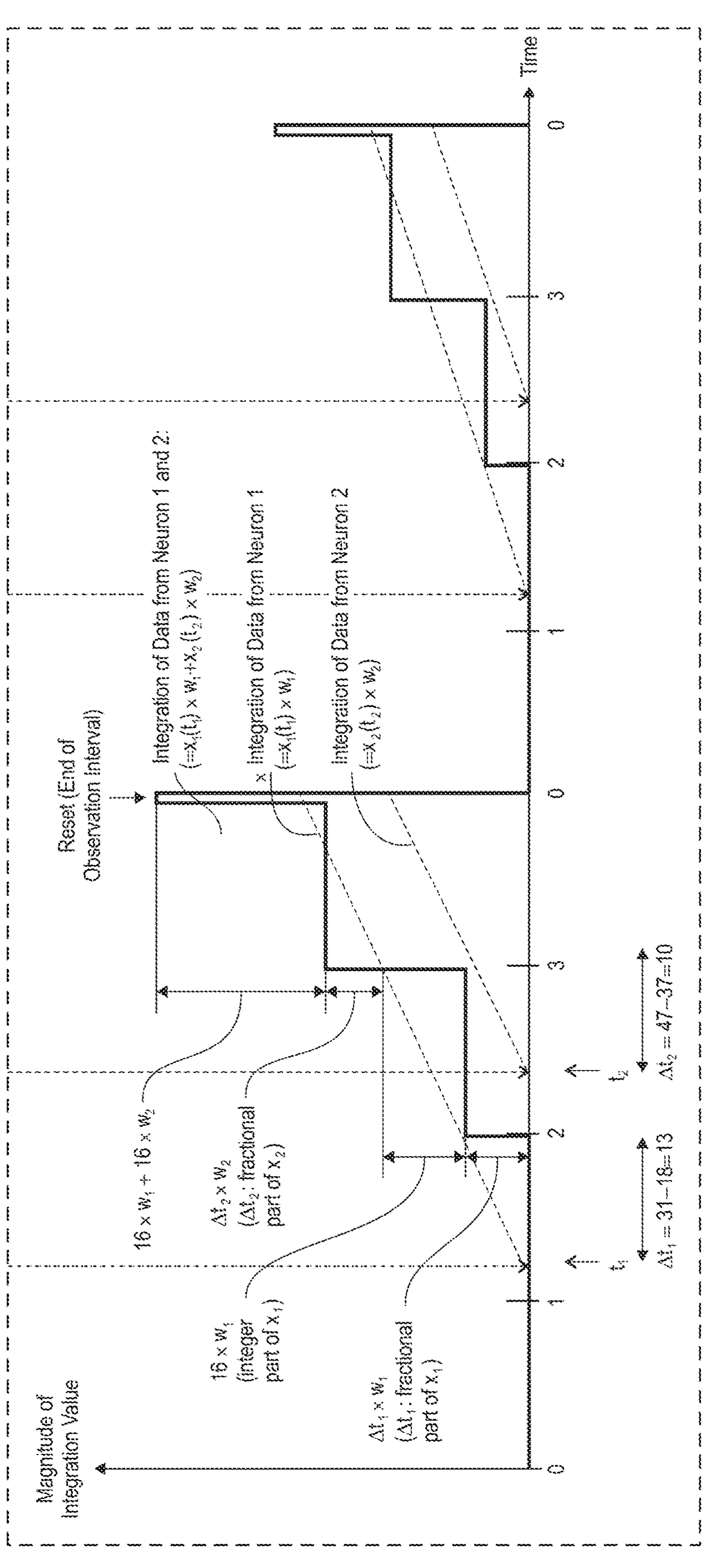
Figure 6D:
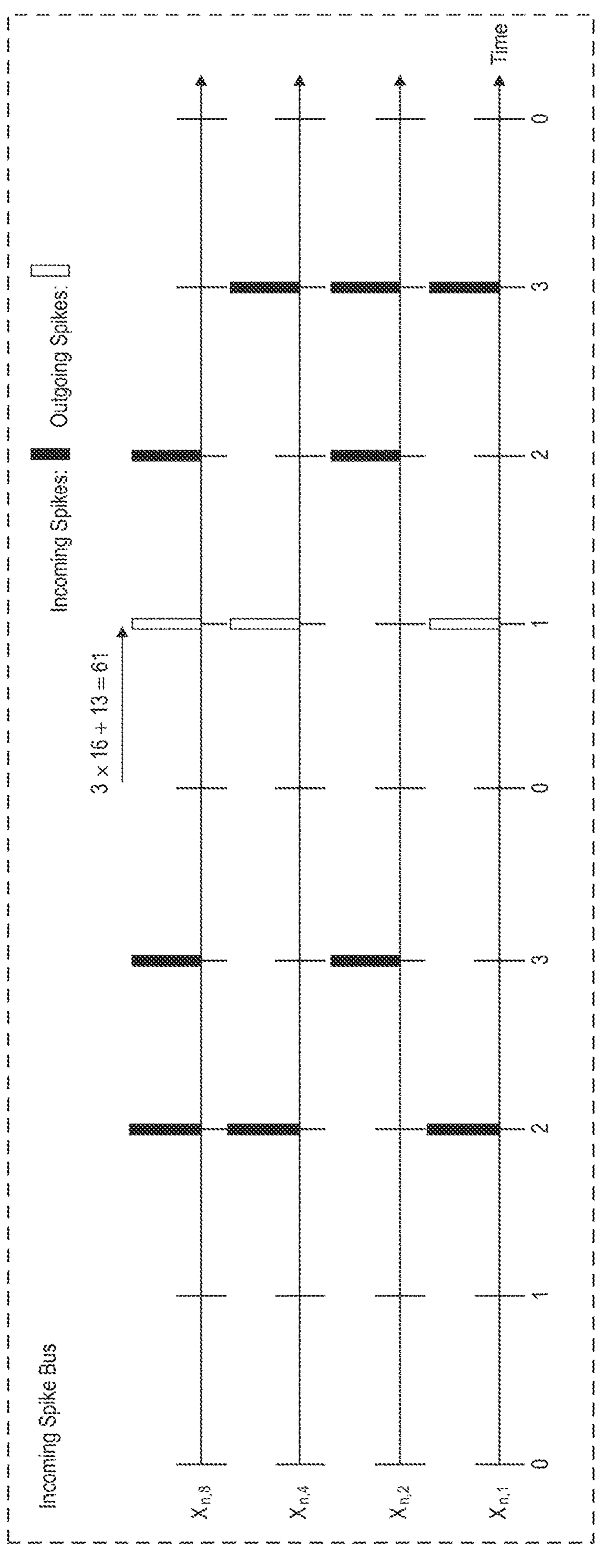

In the example of FIGS. 6C-6D, incoming spikes are assumed to be received from a first neuron (i.e., "neuron 1" in FIG. 6C) during the time interval $t_{12}$ (i.e., between t=1 and t=2 according to the axis labels of FIGS. 6C and 6D, corresponding to actual time steps). The corresponding spikes are actually displayed at t=2 in FIG. 6D, because the system is agnostic to the precise time at which such spikes were to be received. The received spikes cause the receiver to integrate the first value $\Delta t_1 \times w_1$, as soon as possible. The corresponding increase of the membrane potential is shown at the end of the time interval $t_{12}$ (i.e., at t=2) in FIG. 6C, assuming this step is instantaneously performed. Conversely, the constant part $16 \times w_1$ due for that same interval is assumed to be effectively added during the next time interval $t_{23}$ in this example. A similar process repeats at the next time interval, due to spikes received from the second neuron ("neuron 2"). This causes the receiver neuron 12 to integrate a first value $\Delta t_2 \times w_2$ at the end of the time interval $t_{23}$, while the constant part $16 \times w_2$ is added during the next time interval. And the constant part $16 \times w_1$ that arises due to neuron 1 for the time interval $t_{23}$ is added on top of the value $16 \times w_2$, as shown in FIG. 6C.

Again, FIGS. 6C and 6D assume that the electronic circuit is operated in accordance with a TTS encoding. This means that the reconstructed timing of the spikes refers to time periods extending to an end of an actual time step, i.e., the subcycle timing information encoded in incoming signals received during a given time step corresponds to a remaining time duration until the end of that given time step, as illustrated by double arrows in FIG. 6C. In this example, $\Delta t_1=31-18=13$, while $\Delta t_2$ is assumed to be equal to 47−37=10. As per the TTS approach, the membrane potential is evaluated at the end of each observation interval (corresponding to four actual time steps in this example) and then reset. In the example of FIG. 6C, the final potential is equal to $\Delta t_1 \times w_1 + 16 \times w_1 + \Delta t_2 \times w_2 + 16 \times w_2 + 16 \times w_1$. A similar integration process is performed during the next observation interval.

At the end of an observation interval, the receiver neuron 12 generates and sends outgoing spikes in accordance with a timing that it determines. The outgoing spikes are sent after the end of the current observation interval, i.e., during the next observation interval. In the example of FIGS. 6C and 6D, the value to be encoded in outgoing signals is assumed to be equal to 61. This value corresponds to the value of the membrane potential as obtained at the end of the observation interval, by virtue of the values of the weights $w_1$ and $w_2$. Now, the value 61 can be decomposed into 61=3×16+13, which determines signals that can be sent from the time t=1 in the next observation interval, i.e., the receiving neuron at the next layer will add the value 16, 3 times in a row, i.e., at each of the three residual time intervals. Conversely, the value 13 is encoded by way of 3 fractional signals encoding the value 13 as 1+4+8, in accordance with explanations given earlier. The outgoing spikes will further be multiplied by a corresponding synaptic weight.

Figures 7A, 7B:
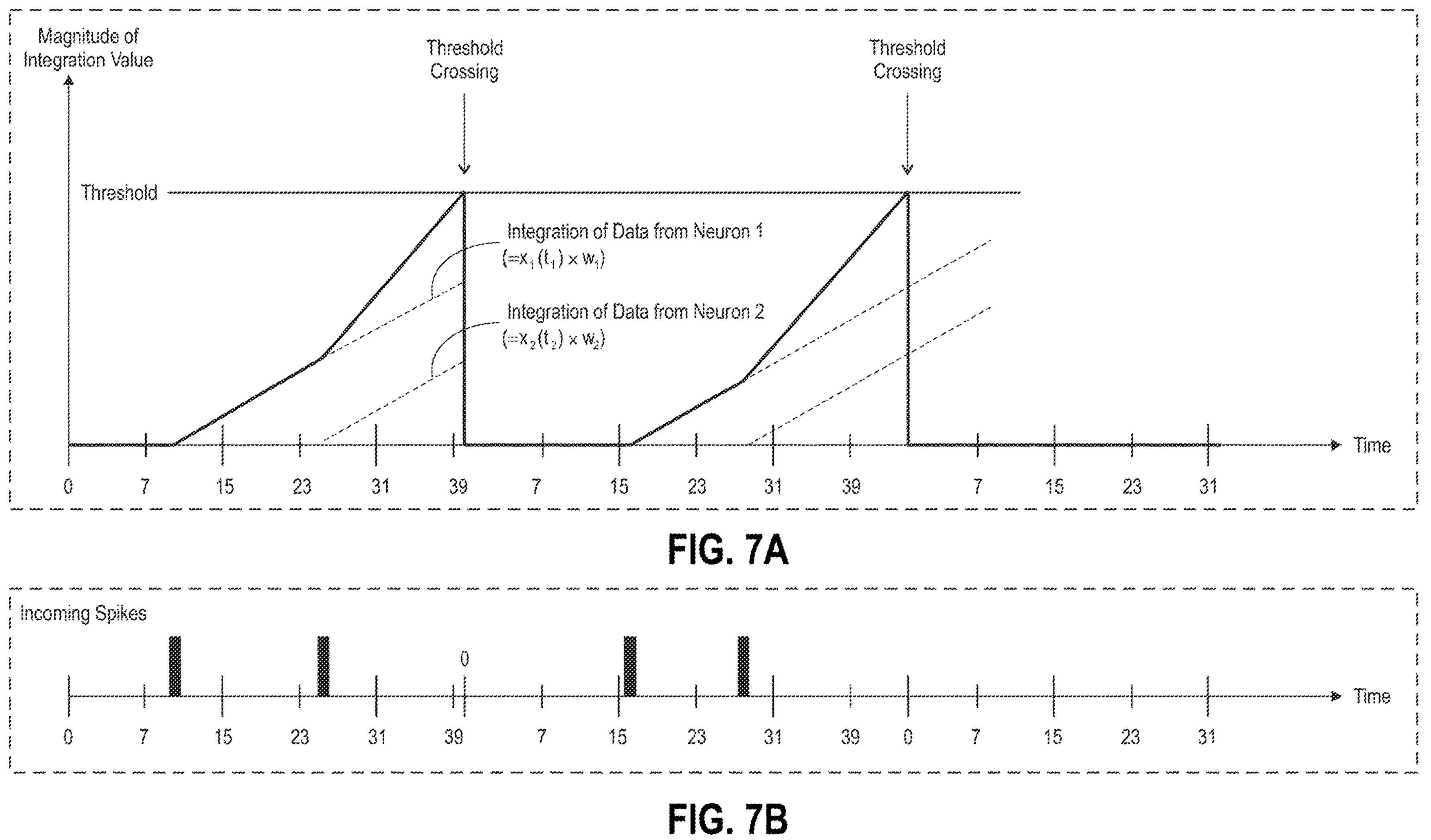
Figure 7C:
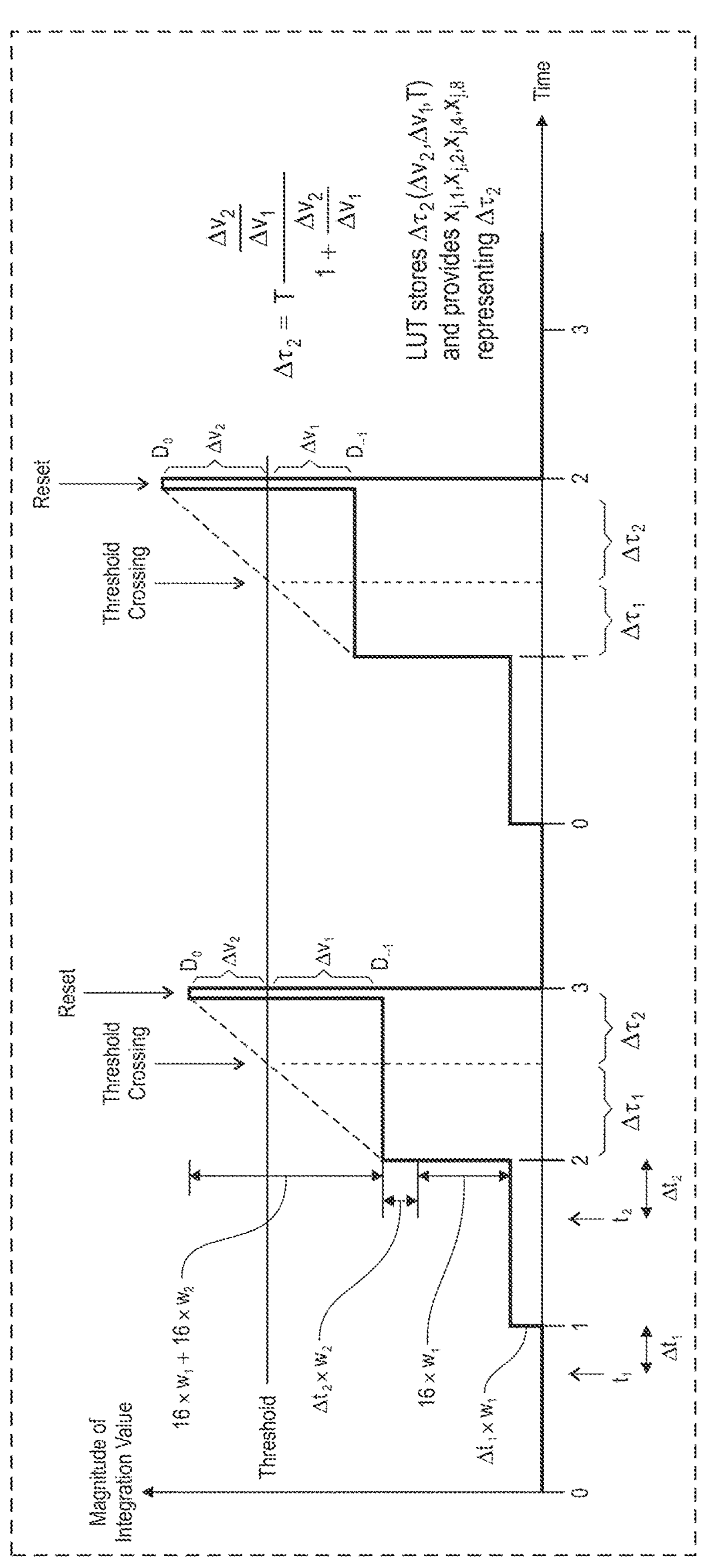
Figure 7D:
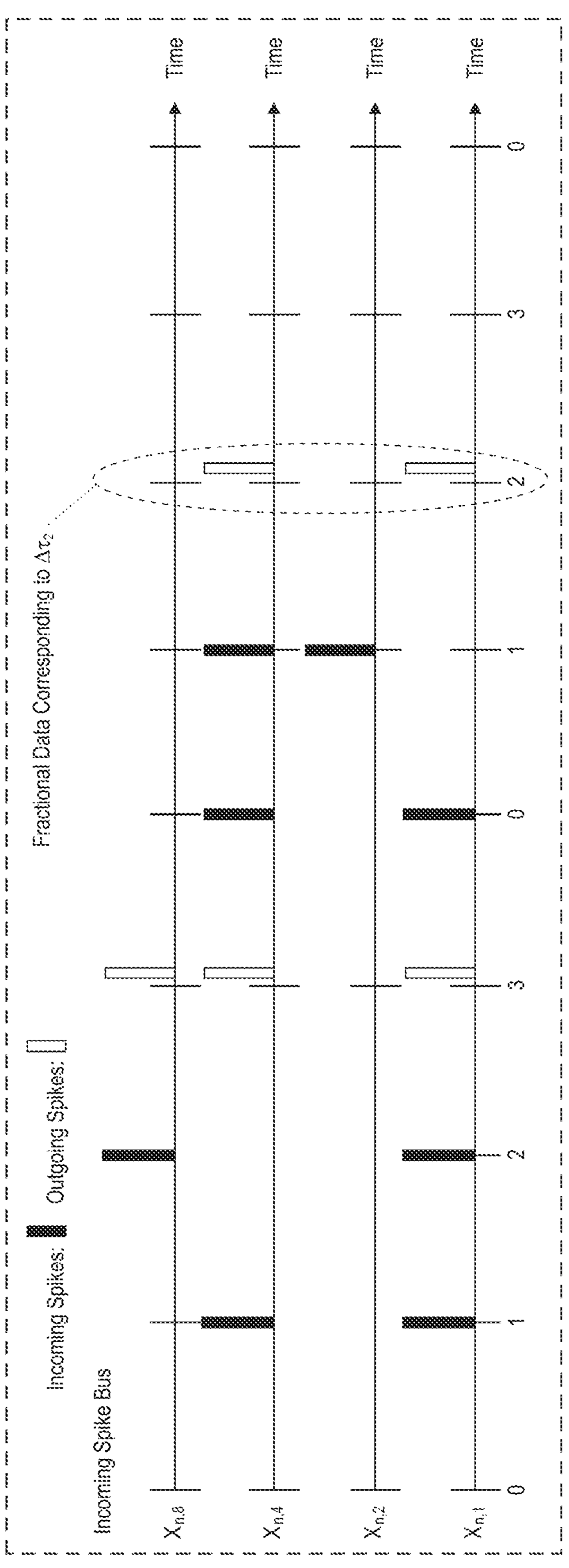

FIGS. 7C and 7D assume that the electronic circuit **10*a* is operated in accordance with a TTFS encoding, i.e., the reconstructed timing of the spikes now refers to time durations elapsed since a beginning of an actual time step. Again, the subcycle timing information is illustrated by double arrows. In detail, spikes are assumed to be received from neuron 1 during the very first time interval $t_{01}$ (i.e., between t=0 and t=1, actual time steps), which causes the receiver to integrate the first value $\Delta t_1 \times w_1$ at the end of the time interval $t_{01}$, while the constant part $16 \times w_1$ due for that same interval is assumed to be effectively added during the next time interval $t_{12}$. A similar process repeats during the next time step, prior to the threshold crossing of the membrane potential, due to spikes received from neuron 2. Accordingly, the receiver neuron 12 integrates a first value $\Delta t_2 \times w_2$ at the end of the time interval $t_{12}$, while the constant part $16 \times w_2$ is added during the next time interval. The constant part $16 \times w_1$ that arises due to neuron 1 is added on top of $16 \times w_2$, as seen in FIG. 7C**. A similar integration process is performed during the next observation interval.

As per the TTFS approach, one must evaluate the moment at which the membrane potential crosses the threshold. However, the decimated time granularity does, a priori, not permit a precise estimation of the crossing time. Still, this information can be recovered thanks to the triangle similarity. In that respect, the subcycle timing information to be encoded in the outgoing signals is determined by looking up timing data in a LUT, based on input values determined in accordance with the triangle similarity, as explicitly indicated in FIGS. 3 and 7C. The aim is to determine $\Delta\tau_2$, i.e., the value corresponding to the residual time after the crossing point. Thus, $\Delta\tau_2$ corresponds to the time interval extending from the crossing point to the end of the corresponding actual time step, as shown in FIG. 7C. The triangle similarity results in $$\Delta\tau_2 = T\frac{\Delta V_2/\Delta V_1}{(1+\Delta V_2/\Delta V_1)},$$

where T corresponds to the observation time interval, and $\Delta V_1$ and $\Delta V_2$ correspond to deviations of consecutive membrane potential values from the threshold line. That is, $\Delta V_1$ corresponds to the positive height difference between the threshold and the last known value $D_{-1}$ of the integrated membrane potential that was still below the threshold (i.e., the last observed value before it crossed the threshold line). Conversely, $\Delta V_2$ corresponds to the (positive) height difference between the first known value $D_0$ of the integrated membrane potential after it has crossed the threshold line and the threshold value. This example assumes that the membrane potential has effectively crossed the threshold, which is not necessarily the case in practice. Again, the value $\Delta\tau_2$ is most efficiently determined thanks to a LUT, which maps values of T, $\Delta V_1$, and $\Delta V_2$, to corresponding values of $\Delta\tau_2$. The corresponding output value can then be encoded as fractional values, which are sent through the parallel channels connecting the receiver neuron 12 to a further neuron. Again, the outgoing spikes will be multiplied by a corresponding synaptic weight at the further neuron. And the same process is performed in respect of all further connected neurons.

To summarize, preferred embodiments of the present methods achieve a latency reduction in tSNNs by partitioning the signaled information into a time-encoded integer part and a fractional part. The fractional part is transmitted as spikes sent in parallel over a binary weighted data bus between the neural units, at a time instant that is determined by the membrane potential value, thus allowing proper time-encoded SNN operations with a smaller number of clock cycles. On the receiver side, the weighted synaptic signals are integrated to obtain the time-varying membrane potential. The membrane potential is evaluated at the end of an observation interval (in a TTS encoding) or at the moment it crosses the predefined threshold line (TTFS encoding), which triggers the transmission of new spikes.

FIGS. 4 and 5 show a preferred flow of operations. The method starts a step S0. The electronic circuit is configured at step S1 to adequately connect pairs of neurons of the tSNN. Once suitably configured, the circuit is operated S2 at its actual clock rate to perform signaling over each pair of connected neurons. Step S2 is subdivided into sub-steps S21, S22, and S23, shown in FIG. 5. Operating S2 the circuit notably causes to update S21 the membrane potential of each receiver neuron. In turn, each receiver neuron determines S22 characteristics of further signals (i.e., outgoing information) in accordance with its updated membrane potential. Each receiver neuron accordingly generates and sends (step S23) outgoing signals through the sets of parallel channels that connect this receiver neuron to further neurons of the tSNN, in accordance with the signal characteristics determined at step S22. The timing of steps S22 and S23 depends on the chosen encoding scheme (TTS or TTFS), as further discussed earlier. This results in producing S3 outputs, i.e., results of inferences performed by the tSNN.

A second aspect of the disclosure in now described in detail. This aspect concerns an electronic circuit for executing a tSNN 1. Basically, the electronic circuit comprises hardware-implemented neurons 10*a*, 10*b*, onto which neurons 10 of the tSNN 1 can be mapped. Thus, the architecture of the circuit 1 reflects that of the underlying neural network, see FIG. 1. The hardware-implemented neurons are also referred to as hardware neurons in this document. They consist of electronic circuits, also referred to as neuronal circuits herein. All hardware neurons are preferably co-integrated in a same chip, i.e., as a whole, the electronic circuit may consist of a single device, i.e., a chip. If necessary, several devices may be connected to each other, to map a desired network architecture.

In all cases, the hardware neurons are connected to each other, in pairs. That is, the electronic circuit connects pairs of neurons 10 of the tSNN, where each pair of neurons connects a sender neuron 11 to a receiver neuron 12 through a set of parallel channels 15, as seen in FIG. 1. The hardware neurons of the circuit 1 are preferably fully connected, for the sake of flexibility. That is, some of the connected pairs can be disabled while configuring the circuit, if necessary, should the underlying computational model not require such connections.

Consistently with the first aspect of the disclosure, the electronic circuit 1 is generally configured to operate at an actual clock rate (corresponding to actual time steps). That is, the electronic circuit can perform signaling over each pair of connected neurons at each actual time step. Signaling is performed by sending signals in parallel across the parallel channels 15. In operation, the signals sent across the parallel channels encode subcycle timing information, i.e., information about the timing of spikes relative to subcycle time steps. As explained earlier, the unit duration of the subcycle time steps corresponds to a duration of each actual time step divided by the latency reduction factor L. This, in turn, allows the electronic circuit to be operated so as to emulate an execution of the tSNN 1 at an effective clock rate corresponding to the actual clock rate multiplied by the latency reduction factor.

As explained earlier, this factor is preferably equal to $2^l$, where l is equal to the number of parallel channels 15 in each pair connection. The parallel channels 15 are associated with respective channel weights, which increase in powers of 2, i.e., the sequence follows a geometric progression, in which the first term is equal to 1 and the common ratio is equal to 2. A preferred implementation is one in which l=4 and L=16, as assumed in FIGS. 2 and 3. The electronic circuit preferably includes one or more LUTs, if only to efficiently process fractional values conveyed through the parallel channels, i.e., as explained earlier, each receiver neuron 12 may update its membrane potential in accordance with each of a first value and a second value. The first value encompasses the reconstructed timing of the spikes obtained as a multiplication of the relevant synaptic weight by the sum of fractional timing values as encoded in the respective signals received. The second value corresponds to a constant value obtained by multiplying the latency reduction factor L by the relevant synaptic weight.

The electronic circuit is generally configured to perform steps described in reference to the present methods. In particular, each receiver neuron 12 may process, at each actual time step, the signals it receives to reconstruct a timing of the spikes and accordingly update its membrane potential. In turn, the electronic circuit may generate (e.g., at a subsequent time step) outgoing signals in accordance with the updated membrane potential, where such signals encode subcycle timing information about outgoing spikes. In operation, such signals are sent to further neurons, through respective sets of parallel channels 15.

Interestingly, the electronic circuit 10*a*, 10*b* may be configured to operate in accordance with a TTS encoding (circuit 10*a*, FIG. 2) or a TTFS encoding (circuit 10*b*, FIG. 3). FIGS. 2 and 3 show preferred implementations, in which each hardware neuron 10*a*, 10*b* includes several synaptic receiver units 101. In principle, each hardware neuron 10*a*, 10*b* must include at least one synaptic receiver unit. In practice, however, each hardware neuron will include several receiver units 101, in particular where the underlying network is fully connected. Only two synaptic receiver units 101 are explicitly shown in FIGS. 2 and 3, for the sake of depiction. However, each hardware neuron is assumed to include N synaptic receiver units 101, where N corresponds to the number of neurons in the previous layer (in a fully connected network). Note, the circuits 10*a*, 10*b* shown in FIGS. 2 and 3 correspond to implementations of neurons in a hidden layer. Simplified versions of such circuits can be used in the input layer. Each synaptic receiver unit 101 is designed to receive and process signals transmitted from connected neurons of the previous layer, through respective sets of parallel channels 15, as shown in FIGS. 2 and 3.

In addition, each hardware-implemented neuron 10*a*, 10*b* includes a ripple-carry-adder (RCA) unit 103, which is connected to the synaptic receiver units 101, e.g., via a carry-save-adder (CSA) tree 102. The RCA unit 103 is generally designed to update a membrane potential of the neuron, in accordance with signals processed at the synaptic receiver units 101 and collected via the CSA tree 102. For completeness, each hardware-implemented neuron 10*a*, 10*b* includes a synaptic transmitter unit 104*a*, 104*b*, which is connected to the RCA unit 103. The synaptic transmitter unit 104*a*, 104*b* is designed to generate and transmit signals in accordance with the updated membrane potential, in operation.

In a conventional ANN hardware neuron (not shown), the incoming data $x_0$ to $x_k$ are first latched and multiplied by the relevant weights $w_0$ to $w_k$. The index of the receiving neuron is omitted for simplicity. The products $w_j x_j$ are then summed up by a CSA tree, similar to the tree 102 of the circuits 10*a*, 10*b*. However, in the case of conventional ANN neurons, the CSA tree has no rippling of the carry signal, which results in a smaller power consumption.

In a TTS neuron 10*a* as proposed in FIG. 2, the incoming signals $x_0$ to $x_k$ are decomposed into $x_{i,1}$, $x_{i,2}$, $x_{i,4}$, and $x_{i,8}$ (noted $Data_{i,1}$, $Data_{i,2}$, $Data_{i,4}$, and $Data_{i,8}$ in FIG. 2). The incoming signals represent spikes meant to occur at respective time instants $t_0$ to $t_k$, i.e., the encoded timing of the spikes is relative to integer time steps as well as subcycle time steps. In each synaptic receiver 101, a spike detector controls a selector to select the appropriate values, see cases a), b), and c). The synaptic receiver outputs are summed up by the CSA tree 102, whose output goes to the RCA unit 103. This adder 103 effectively acts as an integrator that produces time-discrete waveforms corresponding to the membrane potential. The integrator output is fed to the transmitter unit 104*a*. The integration value may for instance be quantized to 6 bits. The time domain (spike signal) is performed by a counter clocked with $f_{Master}$ that counts downwards, i.e., large values lead to early spikes, until the value of the quantized integration value is reached. The higher the value, the earlier an outgoing spike is sent out because it then contributes more to the integration within the successive neuron receiver, the earlier that receiver receives it. Early spikes are therefore more important (representing higher values) than spikes sent out later in time. This is detected by a comparator that controls a pulse generator producing the outgoing spike signals. TTS encoding pursues a synchronous operation, which means that the weight selectors of the synaptic receivers, the integrator as well as the 6-bit register used to hold the integrator value in the transmitter are reset periodically, after determining the value to be transmitted to the next layer. The periodicity of the reset is equal to T, where T is the length of the observation interval.

The TTFS neuron 10*b* depicted in FIG. 3 has similar synaptic receivers as the TTS neuron 10*a*. Also, the successive CSA tree 102 and integrator 103 are identical to those of the TTS neuron 10*a*. The main difference between the TTS and TTFS neurons 10*a*, 10*b* relates to the implementation of the neural transmitter 104*b*, because TTFS pursues an asynchronous operation, where a spike is emitted immediately once the integration value reaches the predetermined threshold value. This can be implemented by a comparator whose output is retimed via a 1-bit register to $f_{Master}$ and controls the pulse generator that emits the outgoing spike signals. The transmitter output is being used as reset signal for the weight selector of the synaptic receiver and the integrator.

Further comments are in order. In each of the examples of FIGS. 2 and 3, the synaptic receiver unit 101 is assumed to operate as a finite state machine (FSM), i.e., an FSM selector is used at the output of a spike detector to add the fractional part and integrate the integer part. The selector can selectively: a) reset to zero; b) activate the LUT to compute fractional values and add the fractional part; and c) integrate the integer part. In variants to using an FSM selector, the fractional part may be added after the integrator (not shown). Two CSA trees are needed in that case. Note, synaptic receiver units, CSA trees and RCA units, and synaptic transmitter units, are generally known per se. In the present context, however, the synaptic receiver units 101 must be adapted to process parallel information, as explained above. In addition, the synaptic transmitter units 104*a*, 104*b* must be configured to determine and send signals in accordance with the chosen encoding scheme, at a decimated timing, and through parallel channels. That is, adaptations to the hardware neurons are needed to efficiently process the integer and fractional parts of the values transmitted by the spikes.

In the examples of FIGS. 2 and 3, each synaptic receiver unit 101 includes (or, at least, accesses) a LUT to efficiently process incoming signals. In addition, the synaptic transmitter unit 104*b* of the hardware neuron 10*b* shown in FIG. 3 includes (or accesses) an additional LUT, to efficiently retrieve timing data. That is, since FIG. 3 assumes a TTFS encoding, the synaptic transmitter unit 104*b* must be configured to determine the subcycle timing information that is to be encoded in the outgoing signals by looking up timing data thanks to LUT, in accordance with the triangle similarity, as explicitly shown in FIG. 3.

The TTS encoding scheme (FIG. 2) results in a synchronous spiking, i.e., each synaptic receiver evaluates the integrator value at the end of each observation interval and the synaptic transmitter sends out weighted spikes that are timed based on the end value of the integrator. Conversely, the TTFS encoding scheme results in asynchronous spiking. That is, the synaptic transmitter sends out weighted spikes as soon as the integrator value at the receiver reaches a threshold value. The amount exceeding the threshold (due to the sub-rate timing for latency reduction) is encoded as a fractional part by the spike weighting.

Tests performed by the inventors have shown substantial improvements of hardware-implemented tSNNs in terms of power efficiency and VLSI area implementation. As noted in the background section, the necessity to generate a sufficiently high time resolution to determine the timing of the spikes results in an energy-consuming clock generation, which makes SNNs less energy-efficient than ANNs if SNNs are implemented in a straightforward way. That is, $P_{ANN}\times\Delta t_{ANN}<P_{SNN}\times\Delta tSNN$, where $P_{ANN}$ and $P_{SNN}$ respectively denote the power consumption of the ANN and SNN, $\Delta t_{ANN}$ is the time duration required to perform a MAC operation of the ANN, and ΔtSNN is the time span required for the timing resolution of the SNN. Despite the fact that $P_{ANN}>P_{SNN}$, the much higher value of ΔtSNN (e.g., $2^6$ for a 6-bit resolution) compared to $\Delta t_{ANN}$ (e.g., ~3 clock cycles) results in that $E_{ANN}<E_{SNN}$, with E denoting the energy of the relevant network ($E=P\times\Delta t$).

With this in mind, the inventors have evaluated relevant parameters of a tSNN with reduced latency (according to embodiments), based on the implementation of an ANN and a tSNN (straightforward implementation). All networks involve similar circuit components, processed using same lithographic techniques. They obtained the following results.

Considering, for example, $P_{ANN}=2.38$ mW, and $\Delta t_{ANN}=4.8$ ns, results in an energy $E_{ANN}=11.44$ pJ. A straightforward ("st") implementation of a tSNN requires $P_{SNN,st}=1.21$ mW. Now, considering $\Delta tSNN_{,st}=42.4$ ns results in an energy $E_{SNN,st}=51.36$ pJ. In comparison, a reduced-latency ("rl") tSNN using $P_{SNN,rl}\sim1.5\times P_{SNN,rl}=1.8$ mW yields, considering $\Delta tSNN_{,rl}=\Delta tSNN_{,rl}/16=42.4$ ns/16=2.65 ns, an energy $E_{SNN,rl}=1.8$ mW×2.65 ns=4.77 pJ. That is, while the power consumption of the reduced-latency tSNN increases by approximately 50% (due to the assumed additional complexity of the weighted spike transmission), the fact that the latency decreases by 16× results in that the resulting tSNN becomes 2.4× more energy efficient than the equivalent ANN.

Some of the techniques described herein can be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher-level carrier) or in a multichip package (such as a ceramic carrier that has either or both surface interconnections and buried interconnections). In any case the chip can then be integrated with other chips, discrete circuit elements, and/or other signal processing devices as part of either (a) an intermediate product, such as a motherboard, or (b) an end product. The end product can be any product that includes integrated circuit chips, ranging from low-end applications to advanced computer products.

While the present disclosure has been described with reference to a limited number of embodiments, variants, and the accompanying drawings, it will be understood by those skilled in the art that various changes may be made, and equivalents may be substituted without departing from the scope of the present disclosure. In particular, a feature (device-like or method-like) recited in a given embodiment, variant or shown in a drawing may be combined with or replace another feature in another embodiment, variant, or drawing, without departing from the scope of the present disclosure. Various combinations of the features described in respect of any of the above embodiments or variants may accordingly be contemplated, that remain within the scope of the appended claims. In addition, many minor modifications may be made to adapt a particular situation or material to the teachings of the present disclosure without departing from its scope. Therefore, it is intended that the present disclosure is not limited to the particular embodiments disclosed, but that the present disclosure will include all embodiments falling within the scope of the appended claims. In addition, many other variants than explicitly touched above can be contemplated. For example, other neuronal circuit designs can be contemplated.

What is claimed is:

1. A method of executing a time-encoded spiking neural network, or tSNN, wherein the method comprises:

configuring an electronic circuit connecting pairs of neurons of the tSNN, wherein each pair of the pairs of neurons connects a sender neuron to a receiver neuron through parallel channels, and operating the electronic circuit at an actual clock rate corresponding to actual time steps, for the electronic circuit to perform signaling over said each pair at each time step of the actual time steps by sending signals in parallel across the parallel channels, wherein the sent signals encode subcycle timing information about a timing of spikes relative to subcycle time steps, a unit duration of which corresponds to a duration of said each time step divided by a latency reduction factor, for the operated electronic circuit to emulate an execution of the tSNN at an effective clock rate corresponding to the actual clock rate multiplied by the latency reduction factor.

2. The method according to claim 1, wherein operating the electronic circuit further comprises, at the receiver neuron, processing, at said each time step, the signals as received at the receiver neuron to reconstruct said timing of the spikes and accordingly update a membrane potential.

3. The method according to claim 2, wherein the membrane potential is updated in accordance with each of a first value and a second value, the first value encompasses the reconstructed timing of the spikes and is obtained as a multiplication of a synaptic weight associated with said each pair by a sum of fractional timing values as encoded in respective ones of the signals sent, and the second value corresponds to a constant value, which is obtained as a multiplication of the latency reduction factor by said synaptic weight.

4. The method according to claim 3, wherein the electronic circuit includes one or more hardware-implemented lookup tables, or LUTs, and the first value is obtained through one of the LUTs.

5. The method according to claim 3, wherein the parallel channels connecting said each pair are associated with respective, predetermined channel weights, whereby the sum of the fractional timing values is computed as a weighted sum, wherein the fractional timing values are weighted in accordance with the respective, predetermined channel weights.

6. The method according to claim 3, wherein the fractional timing values are represented using a binary number representation, the latency reduction factor L is equal to $2^l$, wherein l is equal to the number of the parallel channels, and the respective predetermined weights of the parallel channels follow a geometric progression, in which a first term is equal to 1 and a common ratio is equal to 2.

7. The method according to claim 6, wherein the latency reduction factor is equal to 16, whereby the number of parallel channels is equal to 4 for said each pair.

8. The method according to claim 2, wherein operating the electronic circuit further comprises, at the receiver neuron, determining characteristics of further signals in accordance with the updated membrane potential, the further signals meant to encode subcycle timing information about further spikes, and generating and sending the further signals through the parallel channels connecting the receiver neuron to a further neuron of the tSNN, in accordance with the determined characteristics.

9. The method according to claim 2, wherein the electronic circuit is operated in accordance with a time-to-spike encoding, whereby the reconstructed timing of the spikes refers to time periods extending to an end of said each time step.

10. The method according to claim 2, wherein the electronic circuit operated in accordance with a time-to-first-spike encoding, whereby the reconstructed timing of the spikes refers to time durations elapsed since a beginning of said each time step.

11. An electronic circuit for executing a time-encoded spiking neural network, or tSNN, wherein the electronic circuit comprises hardware-implemented neurons, onto which neurons of the tSNN can be mapped, for the electronic circuit to connect pairs of neurons of the tSNN, where each pair of the pairs of neurons connects a sender neuron to a receiver neuron through parallel channels, and the electronic circuit is configured to operate at an actual clock rate corresponding to actual time steps, for the electronic circuit to perform signaling over said each pair at each time step of the actual time steps by sending signals in parallel across the parallel channels, wherein, in operation, the sent signals encode subcycle timing information about a timing of spikes relative to subcycle time steps, a unit duration of which corresponds to a duration of said each time step divided by a latency reduction factor, for the operated electronic circuit to emulate an execution of the tSNN at an effective clock rate corresponding to the actual clock rate multiplied by the latency reduction factor.

12. The electronic circuit according to claim 11, wherein the latency reduction factor L is equal to $2^l$, where l is equal to the number of parallel channels connecting the sender neuron to the receiver neuron in said each pair, the parallel channels are associated with respective, predetermined channel weights, which follow a geometric progression, in which a first term is equal to 1 and a common ratio is equal to 2.

13. The electronic circuit according to claim 11, wherein any neuron of the hardware-implemented neurons includes one or more synaptic receiver units designed to receive and process signals transmitted through the parallel channels to said any neuron, a ripple carry adder unit designed to update a membrane potential of said any neuron, in accordance with signals processed at the one or more synaptic receiver units, and a synaptic transmitter unit designed to generate and transmit signals in accordance with the updated membrane potential.

14. The electronic circuit according to claim 11, wherein the electronic circuit is further configured so as for the receiver neuron to process, at said each time step, the signals as received at the receiver neuron to reconstruct a timing of the spikes and accordingly update a membrane potential.

15. The electronic circuit according to claim 14, wherein the electronic circuit is further configured to generate, at a subsequent time step of the actual time steps, further signals in accordance with the updated membrane potential, the further signals encoding subcycle timing information about further spikes, and send the further signals generated through the parallel channels connecting the receiver neuron to a further neuron of the tSNN.

16. The electronic circuit according to claim 15, wherein the electronic circuit is further configured to operate in accordance with a time-to-first-spike encoding.

17. The electronic circuit according to claim 16, wherein the electronic circuit includes one or more hardware-implemented lookup tables, or LUTs, and the electronic circuit is further configured to obtain the subcycle timing information to be encoded in the further signals by looking up timing data in one of the one or more LUTs based on input values determined in accordance with a triangle similarity.

18. The electronic circuit according to claim 11, wherein the electronic circuit is further configured to operate in accordance with a time-to-spike encoding.

19. The electronic circuit according to claim 14, wherein the electronic circuit is further configured so as for the receiver neuron to update the membrane potential in accordance with each of a first value and a second value, wherein, in operation, the first value encompasses the reconstructed timing of the spikes and is obtained as a multiplication of a synaptic weight associated with said each pair by a sum of fractional timing values as encoded in respective ones of the signals sent, and the second value corresponds to a constant value, which is obtained as a multiplication of the latency reduction factor by said synaptic weight.

20. The electronic circuit according to claim 19, wherein the electronic circuit includes one or more hardware-implemented lookup tables, or LUTs, and the electronic circuit is further configured to obtain the first value through one of the one or more LUTs.

* * * * *